United States Patent [19]
Beery

[11] 4,058,266
[45] Nov. 15, 1977

[54] STRIP LENGTH MONITORING APPARATUS

[75] Inventor: Jack Beery, Farmington, Mich.

[73] Assignee: Burroughs Corporation, Detroit, Mich.

[21] Appl. No.: 723,383

[22] Filed: Sept. 15, 1976

[51] Int. Cl.² .................... B65H 75/00; B65H 61/00; G01B 5/04
[52] U.S. Cl. .................................. 242/54 R; 33/127
[58] Field of Search .............................. 242/54 R–57, 242/55.3, 186, 191, 61, 62; 33/127–136; 226/137–139; 318/6, 7; 250/57.1; 360/72–74

[56] References Cited

U.S. PATENT DOCUMENTS

| 3,497,957 | 3/1970 | Jorgensen | 33/129 |
| 3,921,220 | 11/1975 | Primosch et al. | 360/72 |
| 3,980,246 | 9/1976 | Deletzke, Jr. | 242/56 R |

*Primary Examiner*—Leonard D. Christian
*Attorney, Agent, or Firm*—David R. Syrowik; Carl Fissell, Jr.; Kevin R. Peterson

[57] ABSTRACT

An apparatus for monitoring the length of a continuous strip of material, such as film, is disclosed. The apparatus includes an alternating current actuated supply motor which drives a rotatable shaft which retains and dispenses a roll of the strip. A capstan drive system receives the dispensed portion of the film from the shaft and a capstan drive shaft incrementally moves the film a predetermined length in steps. An alternating current actuated take-up motor drives a take-up member to take up the film from the capstan drive system. The output from two pairs of sensors operatively connected to the capstan drive system, a signal indicating the incremental movement of the film and the sinusoidal actuating signals are fed into an electronic circuit for monitoring the length of the film remaining on the shaft after a particular rotation and the length of the film on the take-up member.

18 Claims, 6 Drawing Figures

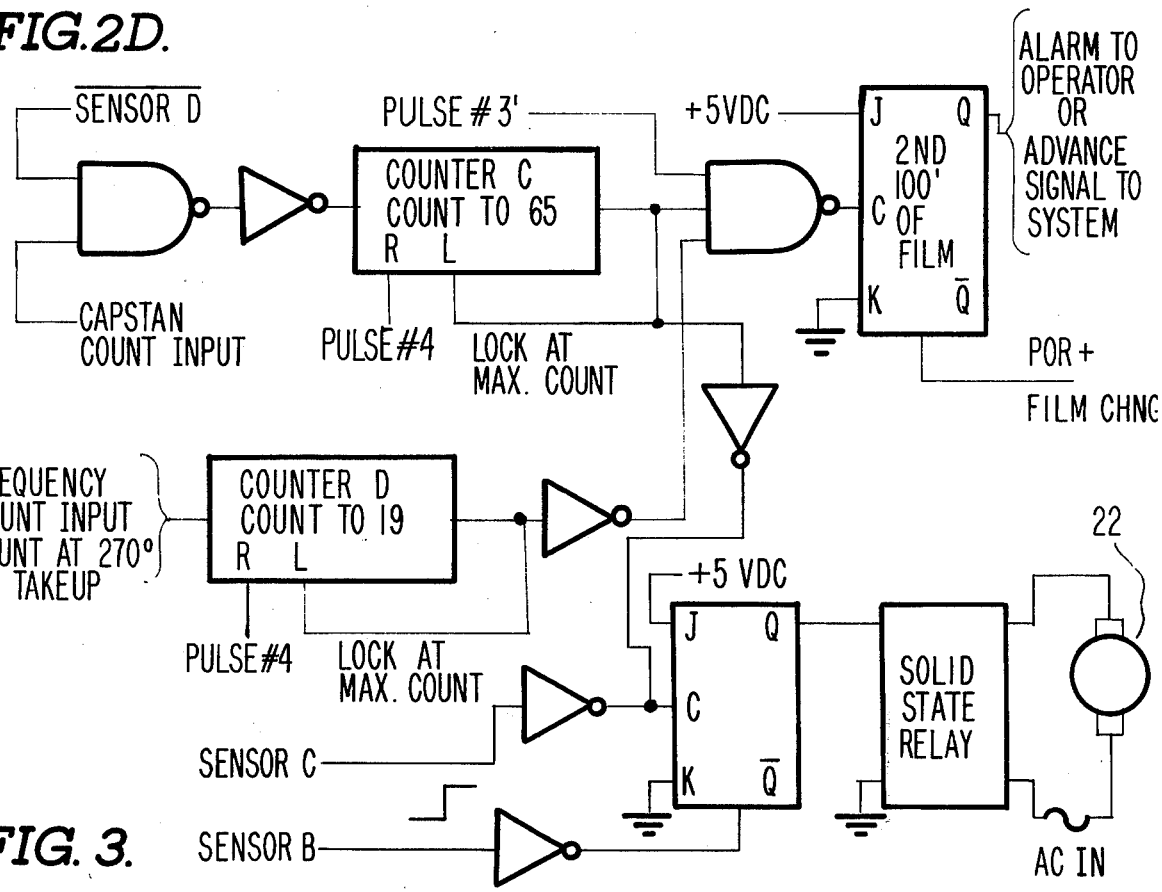

_4,058,266_

STRIP LENGTH MONITORING APPARATUS

BACKGROUND OF THE INVENTION

This invention relates to an apparatus for monitoring the length of a continuous strip of material and, in particular, to an apparatus for monitoring the length of a continuous strip of material moved by a capstan drive system.

In some film supply systems it is desirous to know the length of film remaining on a supply roll. Furthermore, it is often times desirous to know the length of film on the take-up roll of such systems. Depending on the thickness of the film, the diameter of the film on the supply or take-up roll can be directly translated into the length of the film remaining on the supply or take-up roll. It is desirous to know the length of the film on the supply or take-up roll especially when one wants to meter out a specific length of film and does not want the rilm to run completely off the supply roll before filming is stopped. It is also often times desirous to know in advance if the end of the film is approaching so that the remaining time before the end of the film is encountered can be optimized for changing the film.

Many prior art devices employ arms which ride against the film contained in film rolls or cartridges, which arm subsequently moved a flag or indicator to show how much film remains on the roll or cartridge. Low film indications have also been achieved by detecting holes appearing in the film near the end of the film roll or by placing magnetic foil near the end of the film roll and thereafter detecting the magnetic foil. No prior art devices using a capstan drive system are known which are capable of determing the length of film remaining on a supply or take-up roll without altering the film or being in physical contact therewith.

An apparatus for monitoring the length of a continuous strip of material constructed in accordance with the instant invention includes a supply means for supplying the strip. The supply means includes a rotatable shaft adapted for retaining a roll of the strip and rotatably dispensing a predetermined length of the strip during a given rotation. A capstan drive means receives the dispensed portion of the strip from the shaft and incrementally moves the strip the predetermined length in steps. Monitoring means monitors the length of the strip remaining on the shaft after the rotation by measuring the angular displacement of the shaft after the rotation by measuring the predetermined length of the dispensed portion and by correlating the angular displacement and the predetermined length.

DESCRIPTION OF THE DRAWINGS

FIG. 2D is a circuit diagram of a circuit which indicates the length of film taken up; and FIG. 3 shows a timing chart of the system.

DESCRIPTION OF PREFERRED EMBODIMENT

Figure 1:
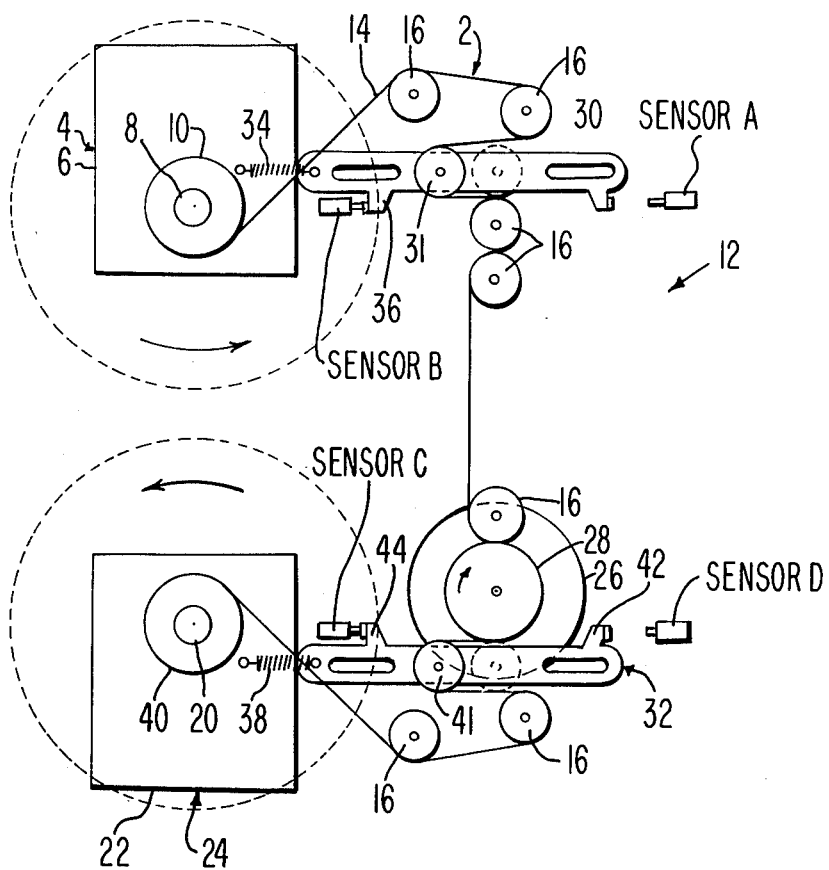
FIG. 1 is a side elevational view of a portion of the apparatus showing the relative position of the film with respect to the apparatus.

FIG. 1 shows a portion of the apparatus constructed in accordance with the instant invention for monitoring the length of a continuous strip of material such as film generally indicated at 2. A supply means generally indicated at 4 supplies the film 2. The supply means 4 includesa rotational means or supply motor 6. The supply motor can be any type of alternating current powered permanent magnet motor. The supply means 4 includes a rotatable shaft 8 and is adapted to retain a rolled up portion on roll 10 of the film 2. As shown in FIG. 1, the shaft 8 is made to rotate by the supply motor 6 in a counterclockwise direction thereby dispensing a predetermined length of the film 2, which predetermined length is determined by the amount of the rotation and the diameter of the film 2 on the roll 10. In the present example the shaft 8 rotates 2.5° for every cycle of alternating current which may be 50 or 60 cycles per second.

A capstan drive means or a capstan drive system generally indicated at 12 receives a dispensed portion 14 of the film 2 from the shaft 8. The capstan drive system 12 incrementally moves the dispensed portion 14 of the film 2 the predetermined length which was dispensed in steps of 0.02 inches and will be hereinafter described in greater detail.

The capstan drive system 12 includes a plurality of pulley-like members 16 which are fixedly mounted to a backing plate (not shown), which backing plate also supports the remaining apparatus as shown in FIG. 1. The members 16 project outwardly from the backing plate. The upper two members 16 and the lower two members 16 prevent the dispensed portion 14 of the film 2 from slidably moving thereover during the incremental movement until the shaft 8 is rotated by the supply motor 6 or a rotatable take-up member 20 is rotated in a counterclockwise direction by a take-up motor 22, respectively. The member 20 and the take-up motor 22 will be described in greater detail hereinafter but is sufficient here to say that the member 20 and the take-up motor 22 define a take-up means generally indicated at 24 for taking up the dispensed portion 17 of the film 2 from the capstan drive system 12.

The capstan drive system 12 includes a capstan drive motor 26 and a capstan drive shaft 28. The capstan drive shaft 28 frictionally engages the film 2 so that when the capstan drive motor 26 rotates in a stepping fashion the film 2 moves in a downwardly direction in steps of 0.02 inches.

The capstan drive system 12 also includes a pair of tension arms — an upper tension arm generally indicated at 30 and a lower tension arm generally indicated at 32. The upper tension arm 30 is adapted to move between a sensor A and a sensor B by sliding along the surface of the backing plate. As shown in FIG. 1, an upper pulley 31 is fixedly attached to the upper tension arm 30 and extends therefrom so that as the film 2 is moved downwardly by the capstan drive shaft 28 in incremental steps of a fixed length, the entire upper tension arm 30 is caused to move from the position as shown in FIG. 2 to the phantom position shown in FIG. 1 in which only the upper pulley 32 is shown. The upper tension arm 30 is biased against moving toward the sensor A by an upper biasing spring 34. The upper biasing spring is attached to one end of the upper tension arm 30 and at its opposite end to the supply motor 6. After the upper tension arm 30 has shifted to the right as shown by the phantom view of the upper pulley 31, a right hand portion 34 of the upper tension arm 30 physically encounters the sensor A to activate it, which activation will be described in greater detail hereinafter. It is sufficient to say at this point that the upper tension arm 30 moves in one continuous motion to the left until it encounters sensor B at a left-hand portion 36 of the upper tension arm 30 due to the biasing action of the spring 34. The upper tension arm 30 moves incrementally toward sensor A as a result of the downward incremental movement of the film 2 against the biasing action of the biasing spring 34 since the film 2 does not move over the upper two pulley members 16 during this downward incremental movement. It is only when another length of film 2 is dispensed from the roll 10, is slack introduced into the system and consequently the biasing action of the spring 34 moves the upper tension arm 30 back toward sensor B in one continuous movement.

The lower tension arm 32 of the capstan drive system 12 moves in substantially the same fashion as the upper tension arm 30. Again, as long as the take-up member 20 is not caused to rotate by the take-up motor 22, the film 2 does not move over the lower two pulley members 16. As a result, as the capstan drive shaft 28 moves the film 2 downwardly, the lower tension arm 32 incrementally moves towards a sensor C under the biasing action of a lower biasing spring 38. The lower biasing spring 38 is attached at one of its ends to the take-up motor 22 and at its opposite end to the lower tension arm 32. It is only when the take-up motor 22, which is also an alternating current powered permanent magnet motor, is energized by a sinusoidal voltage of a predetermined frequency such as 50 or 60 hertz, does the member 20 rotate in the counterclockwise direction, as shown, to cause the film 2 to be taken up on a take-up roll 40. As a result, the film 2 moves over the lower pulley members 16 to move the lower tension arm 32 by means of a lower pulley 41, similar to the upper pulley 31, towards a sensor D which is encountered by a right-hand portion 42 of the lower tension arm 32. The operation of sensor D will be described in greater detail hereinafter. Like the upper tension arm 30, the lower tension arm 32 also includes a left-hand portion 44 adapted for encountering the sensor C.

The operation of the subject invention for monitoring the length of the rolled up portion 10 of the film 2 will now be described with reference to FIGS. 2A, 2C and 3.

Figure 2A:
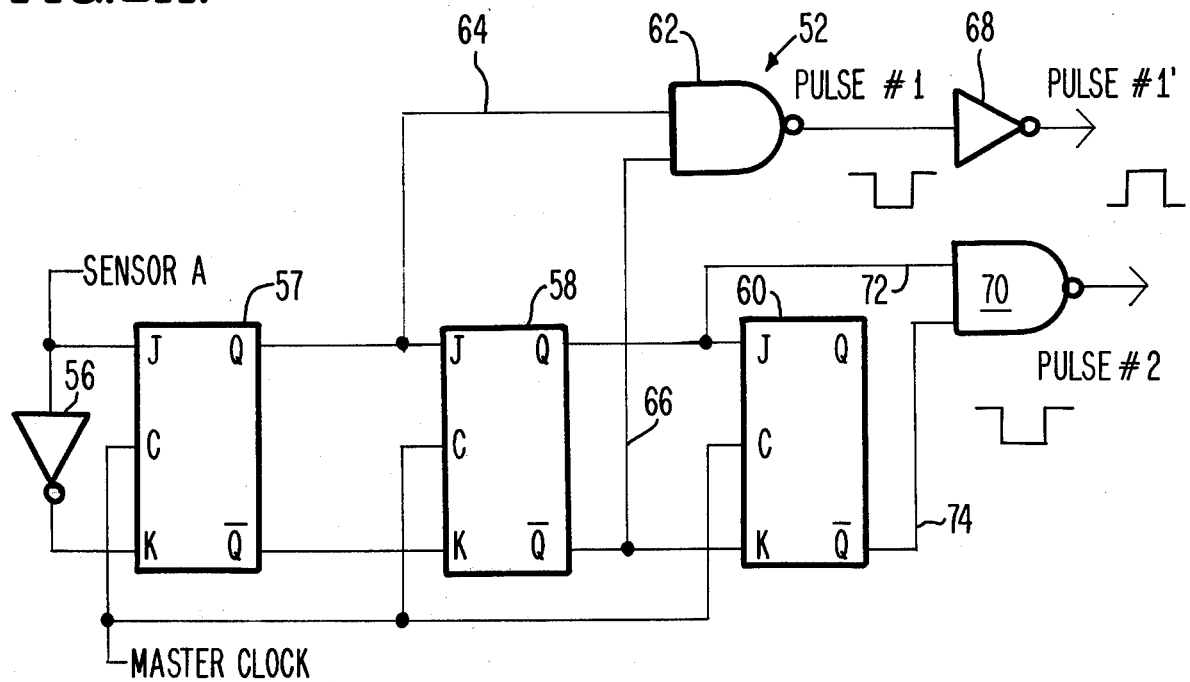
FIG. 2A is a circuit diagram of a first pulse forming network used in the apparatus.
Figure 2B:
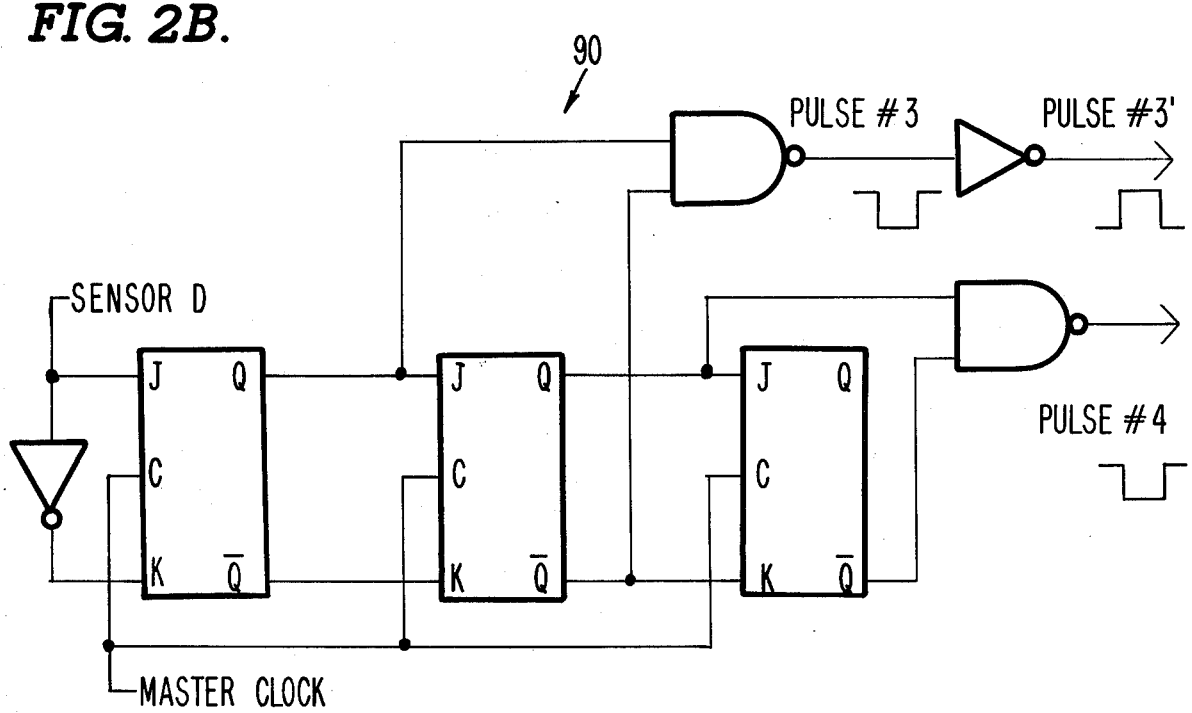
FIG. 2B is a circuit diagram of a second pulse forming network used in the apparatus.
Figure 2C:
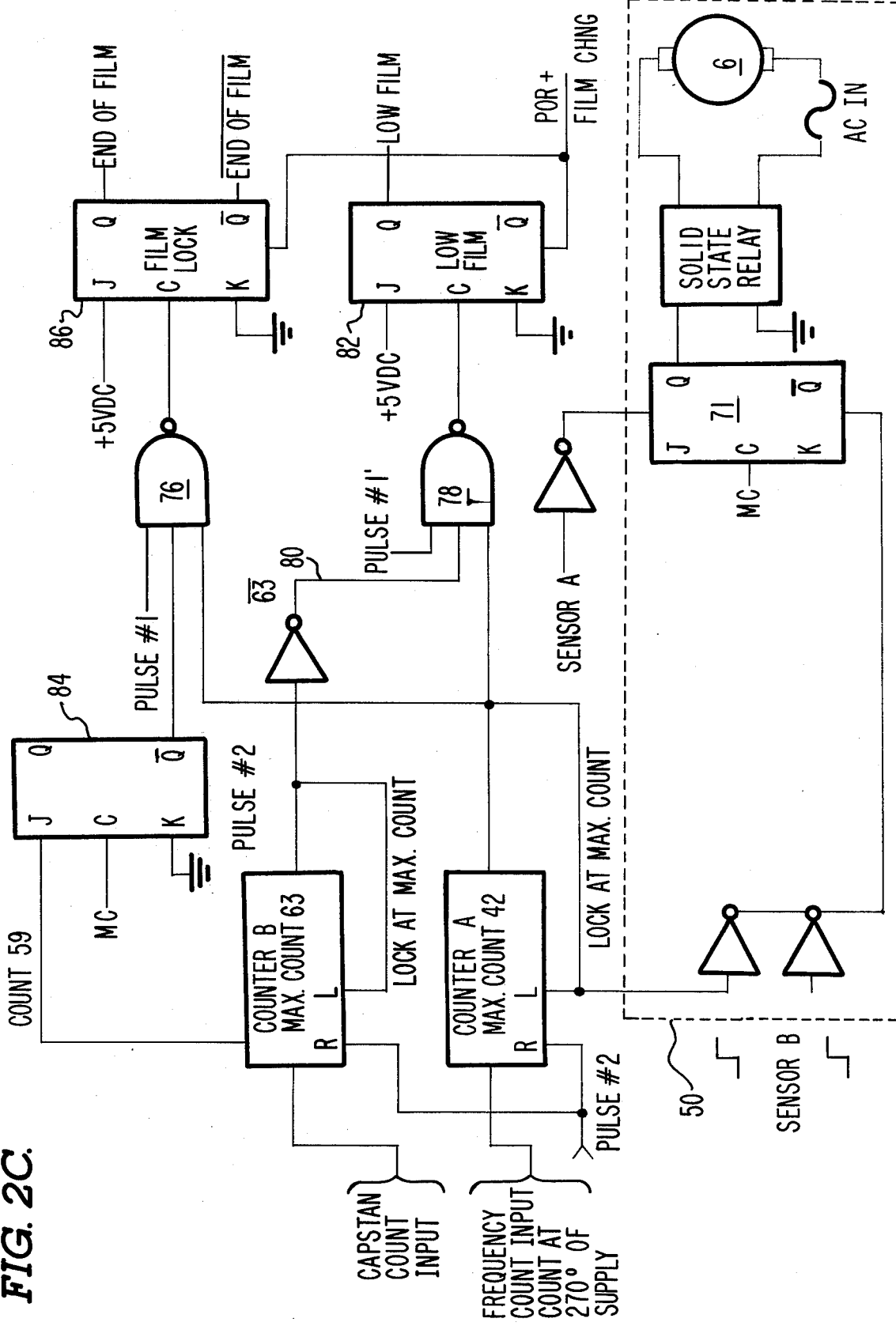
FIG. 2C is a circuit diagram of a circuit which indicates the length of film remaining to be supplied.

As long as the film roll 10 is full beyond the point of interest, sensor B accomplishes the turn-off of supply motor 6 as shown in FIG. 2C. As shown in FIG. 2C when sensor B is encountered by the left-hand portion 36 of the upper tension arm 30, sensor B which is of well-known construction, operates through an inverter 50 to reset a typical JK flip-flop 71 thereby turning off a solid state relay 73 which is placed in series with the alternating current supply and the supply motor 6, thereby turning off the supply motor 6. However, as the rolled up portion 10 of the film 2 becomes smaller and smaller, monitoring becomes necessary. The operation of sensor A thereform becomes most important and will be described now in greater detail.

When the right-hand portion 34 of the upper tension arm 30 encounters sensor A, sensor A outputs a voltage, which voltage is converted by a first pulse forming means or first pulse forming network generally indicated at 52 in FIG. 2A. As shown, in the system timing diagram in FIG. 3, pulse number one and pulse number 2 are formed when the voltage level of the output of sensor A increases. Pulse number 1 is a positive pulse which appears immediately prior to pulse number 2 which is a negative pulse. The first pulse-forming network 52 includes three standard JK flip-flops which form a counter or shift register. Each of the flip-flops are clocked by a master clock. The J input to the first JK flip-flop 54 is connected to the sensor A. The K input to the first JK flip-flop 54 is also fed by sensor A after going through an inverter 56. The Q output of the first JK flip-flop 54 is fed into the J input of the second JK flip-flop 58 and the Q output of the first JK flip-flop 54 is fed into the K input of the second JK flip-flop 58. As can be seen from the timing diagram in FIG. 3, as long as sensor A is in its low state, the first JK flip-flop 54, the second JK flip-flop 58 and a third JK flip-flop 60 are in a low condition due to the fact that the master clock is continually clocking each of the JK flip-flops 54, 58 & 60. It is only when sensor A goes to its high state and a master clock pulse occurs that the first flip-flop 54 goes to its high state. When this occurs, pulse number 1 is formed by an NAND gate 62 having inputs along lines 64 and 66. The second JK flip-flop 58 will remain in its low state for a length of time equal to the period of the master clock while the first JK flip-flop remains in its high state. Therefore, pulse number 1 has a pulse width equal to the time period of the master clock. Pulse number one is subsequently inverted by means of an inverter 68 to obtain pulse number 1. Pulse number 2 is formed in that space of time when the second JK flip-flop 58 is in its one state while the third JK flip-flop 60 is in its low state. This occurs one clock pulse after the formation of pulse number one as shown on the master timing diagram in FIG. 3. A second NAND gate 70 provides pulse number 2 by sampling the Q output of the second JK flip-flop 58 along line 72 and logically NANDing that Q output with the Q output of third JK flip-flop 60 along line 74.

The monitoring means of the subject invention includes a first measuring means or a counter B as shown in FIG. 2C. Counter B is an electronic memory device for storing the number of steps or increments that the capstan drive shaft 28 has rotated. In the present embodiment, the capstan drive shaft 28 increments the film 2 at the capstan drive shaft 28 .02 inches per step. Therefore, it can be seen that by counting the number of steps or capstan count inputs, it is possible to determine the predetermined length of the dispensed portion 14 of the film 2 between the times when sensor A is consecutively contacted by the right-hand portion 34 of the upper tension arm 32. Initially, pulse nunber 1 which comes from the first pulse-forming network 52 via sensor A checks the output of counters A or second measuring means and B by means of NAND gates 76 and 78 whose outputs act as clocks to JK flip-flops to be described in greater detail hereinafter. Assuming that a low film condition does not exist, the system remains operable and pulse number 2 will reset counter B. Sensor A also turns on the supply motor 6 by setting the JK flip-flop 71. When the AC supply motor 6 is turned on via relay 73 to move the upper tension arm 30 towards sensor B, each cycle of the alternating current will add one count to counter A at approximately 270° of the alternating current. Counter A by design has a maximum count capability of 42 and when this capability is reached, the AC supply motor 6 will turn off prior to the time that sensor B is contacted by the upper tension arm 30 by resetting the JK flip-flop 71 to turn off relay 73. As noted previously, with a larger supply roll 10, sensor B will be contacted by the upper tension arm 30 prior to counter A attaining its maximum count of 42.

Counter B has a maximum count of 63 and if this count is achieved before sensor A is again contacted by the upper tension arm 30 as it incrementally moves towards sensor A, by design, the film roll 10 is now low or in a low condition. However, if sensor A is contacted before the count of 63 is achieved as shown along line 80 and at the same time counter A has reached the count of 42 indicating 42 cycles or number of actuating signals, a low film condition exists. As a result, a low film JK flip-flop 82 will indicate a low film condition. Flip-flop 82 can only be turned off when there is a film change or there is a power-on-reset to reset the flip-flop 82.

Counter B also feeds JK flip-flop 84 which outputs along its Q output a signal indicating the counter B has not reached a count of 59. If taken with the maximum count of 42 from counter A, along with pulse number 1, the occurrence of all three signals as logically NANDed together by NAND gate 76 gives a pulse which is clocked into a film lock flip-flop 86, the condition of flip-flop 86 indicating an end of film condition along output Q. Both outputs of the film lock flip-flop 86 are inputted to flip-flop 71 along their K and J inputs respectively, to cause the machine and, more particularly, the supply motor 6 to lock up.

What both flip-flops 82 and 86 indicate are two conditions wherein the angular rotation of the shaft 8 has increased relative to the amount of dispensed film 14 since the diameter of the film roll 10 had decreased to a changeable level.

FIG. 2B shows a second pulse forming network generally indicated at 90. A detailed description of the second pulse forming network 90 will not be given since the second pulse forming network 90 is exactly the same as the first pulse forming network 52 except sensor D is substituted for sensor A, pulse number 3 is substituted for pulse number 1, pulse number 3 is substituted for pulse number 1 and pulse number 4 is substituted for pulse number 2. This fact is more particularly shown in the system timing diagram as shown in FIG. 3.

That portion of the apparatus which monitors the rolled up length of the film on the member 20 will now be described with reference to FIG. 2D. The apparatus for monitoring the rolled up length of the film 2 on the member 20 includes a control means for indicating a predetermined length of film on the member 20 and measuring the angular displacement of the member 20 after taking up the length of the film 2 moved during the previous predetermined amount of incremental movement of the film 2 by the capstan drive shaft 28. The control means includes the operation of the sensors C and D as previously described and also the second pulse forming network 90, previously described.

Typically the take-up roll 40 would cycle on and off on demand of the lower tension arm 32 moving between sensor C and sensor D; sensor C telling the take-up motor 22 to turn on through a JK flip-flop and a second solid state relay as shown in FIG. 20. The take-up motor 22 thus operates in much the same fashion as the supply motor 6. Sensor D tells the take-up motor to turn off by resetting the JK flip-flop.

Typical processors that handle the developed microfilm or film 2 only work with rolls that hold 100 feet of 0.005 inch film. This diameter is approximately 3.3 inches. However, in microfilming it is useful to use rolls of film larger than this, and in some cases, several times larger. The system that is being described herein uses a roll that holds 200 feet of 0.005 inch film and in this case it is desirable to have an unused space on the film 2 when the film roll 40 diameter reaches a full roll (about 3.3 inches). This can be achieved by the capstan drive system 12 in association with the take-up motor 22 in a similar fashion as the low film condition was detected on the supply roll 10. In this case, when the sensor D turns off the take-up motor 22, a set of two pulses labeled pulse number 3' and pulse number 4 in the system timing diagram are supplied. Pulse number 3' checks the film roll 40 diameter and pulse number 4 resets counters C and D if the system is not turned off by the check performed by pulse number 3'. Counter C counts up the number of steps as the lower tension arm 32 moves towards sensor C. When counter C reaches some predetermined count, for our purposes 65, the take-up motor 22 will turn on and sinusoidal cycles that the take-up motor 22 operates on will count up in counter D. When the count in counter D is less than 19 cycles, the roll 40 of film 2 that is approximately 3.3 inches in diameter is on the member 20. If the number in counter D is greater than this, the length of film 2 on member 20 is below the 100 ft. level. When a 100 foot roll of film 2 is detected on the member 20 as indicated by the JK flip-flop in FIG. 20. The system can either, by operator or programatically, be advanced to supply the blank piece of film that is desirable for separating the microfilm into approximately 100 foot increments.

I claim:

1. An apparatus for monitoring the length of a continuous strip of material, said apparatus comprising:
   a supply means for supplying the strip, said supply means including a rotatable shaft adapted for retaining a roll of the strip and for rotatably dispensing a predetermined length of the strip during a given rotation;
   capstan drive means for receiving the dispensed portion of the strip from said shaft and for incrementally moving the strip the predetermined length in steps; and
   monitoring means for monitoring the length of the strip remaining on the shaft after said rotation by measuring the angular displacement of said shaft after said rotation, by measuring the predetermined length of the dispensed portion, and by correlating said angular displacement and said predetermined length.

2. The apparatus as defined in claim 1 wherein said steps are equal in length and wherein said monitoring means includes first measuring means for measuring the number of steps required to move the strip a predetermined length.

3. The apparatus as defined in claim 2 wherein said supply means includes rotational means for rotating said shaft, said shaft rotating in response to an actuating signal of said rotational means.

4. The apparatus as defined in claim 3 wherein said rotational means rotates said shaft a fixed angular displacement in response to the actuating signal and wherein said monitoring means includes second measuring means for measuring the number of actuating signals required to dispense the predetermined length of strip.

5. The apparatus as defined in claim 4 wherein said monitoring means includes logic means responsive to said number of steps and said number of actuating signals for determining when a predetermined amount of film remains on said shaft.

6. The apparatus as defined in claim 5 wherein said monitoring means includes sensing means for sensing when the strip has moved the predetermined length and providing a sensor signal to enable said rotational means to rotate said shaft.

7. The apparatus as defined in claim 6 wherein each of said first and second measuring means includes an electronic memory device for storing said number of steps and said number of actuating signals respectively and wherein said logic means includes at least one multivibrator circuit having first and second stages wherein one of said stages indicates that a predetermined length of strip is retained on said shaft.

8. The apparatus as defined in claim 7 including a take-up means for taking up the strip from said capstan drive means.

9. An apparatus for monitoring the length of a roll of a strip mounted on a rotatable shaft, the strip being received from the shaft and incrementally moved in steps of a fixed distance by a capstan drive system after a predetermined length of the strip is dispensed during a given rotation, the angular displacement of the shaft varying as the length of the roll mounted on the shaft varies, said apparatus comprising:
   first measuring means for measuring the varying angular displacement of the shaft after the given rotation;
   second measuring means for measuring the predetermined length of the dispensed portion; and
   logic means for correlating said angular displacement and said predetermined length.

10. An apparatus for monitoring the rolled-up length of a continuous strip of material, said apparatus comprising:
   a capstan drive means for incrementally moving the strip in steps;
   take-up means for taking up the strip from said capstan drive means, said take-up means including a rotatable member adapted for retaining a roll of the strip, said member taking up the strip after a predetermined amount of said incremental movement; and
   control means for indicating a predetermined length of strip on said member by measuring the angular displacement of said member after taking up the length of strip moved during said predetermined amount of incremental movement.

11. The apparatus as defined in claim 10 wherein said take-up means includes revolving means for rotating said member, said member rotating in response to a driving signal of said revolving means.

12. The apparatus as defined in claim 11 wherein said revolving means rotates said member a fixed angular displacement in response to the driving signal and wherein said control means includes a first determining means for determining the number of driving signals required to take-up the length of strip moved during said predetermined amount of incremental movement.

13. The apparatus as defined in claim 12 wherein said steps are equal in length and wherein said control means includes second determining means for determining the number of steps during said predetermined amount of incremental movement.

14. The apparatus as defined in claim 13 wherein said control means includes circuit means responsive to said number of steps and said number of driving signals for determining when a predetermined length of strip is rolled up on said member.

15. The apparatus as defined in claim 14 wherein said control means includes detecting means for detecting when said member has taken up the length of strip moved during said predetermined amount of incremental movement and for providing a detecting signal to prevent said revolving means from rotating said member.

16. The apparatus as defined in claim 15 wherein each of said first and second determining means includes an electronic memory device for storing said number of driving signals and said number of steps respectively and wherein said circuit means includes at least one multivibrator circuit having first and second stages wherein one of said stages indicates that said predetermined length of strip is rolled up on said member.

17. The apparatus as defined in claim 16 including a supply means for supplying the strip to the capstan means.

18. An apparatus for monitoring the length of a roll of strip mounted on a rotatable member, the strip being moved by a capstan drive system which system incrementally moves the strip a predetermined amount in steps of a fixed distance, the member taking up the strip the predetermined amount by rotating to a varying angular displacement dependent on the length of strip on the member, said apparatus comprising:
   first determining means for determining the varying angular displacement of the member necessary for the member to take up the strip the predetermined amount; and
   circuit means for determining when the angular displacement is below a predetermined amount.

* * * * *

UNITED STATES PATENT OFFICE
CERTIFICATE OF CORRECTION

Patent No. 4,058,266     Dated November 15, 1977

Inventor(s) Jack Beery

It is certified that error appears in the above-identified patent and that said Letters Patent are hereby corrected as shown below:

Col. 1, line 21, should read "film".
Col. 3, line 61, should read "therefore becomes".
Col. 4, line 12, should read "$\bar{Q}$ output"
line 37, should read "$\bar{Q}$ output" (second occurrence)
Col. 5, line 18, should read "$\bar{Q}$ output"

*Signed and Sealed this*

*Twenty-first* Day of *February 1978*

[SEAL]

Attest:

RUTH C. MASON
*Attesting Officer*

LUTRELLE F. PARKER
*Acting Commissioner of Patents and Trademarks*